(12) United States Patent
Mclaughlin

(10) Patent No.: US 11,467,020 B1
(45) Date of Patent: Oct. 11, 2022

(54) METHOD AND APPARATUS FOR VALIDATING A CAPACITIVE FUEL LEVEL SENSOR

(71) Applicant: Simmonds Precision Products, Inc., Vergennes, VT (US)

(72) Inventor: Russell Mclaughlin, Charlotte, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 17/328,742

(22) Filed: May 24, 2021

(51) Int. Cl.
*G01F 25/20* (2022.01)
*G01F 23/263* (2022.01)
*G01F 23/26* (2022.01)

(52) U.S. Cl.
CPC .............. *G01F 25/20* (2022.01); *G01F 23/26* (2013.01); *G01F 23/263* (2013.01); *G01F 25/24* (2022.01)

(58) Field of Classification Search
CPC ........ G01F 25/20; G01F 23/26; G01F 23/263; G01F 25/24
See application file for complete search history.

(56) References Cited

U.S. PATENT DOCUMENTS

| 4,147,050 A | 4/1979 | Rubel et al. |
| 7,728,603 B2 | 6/2010 | Delorme et al. |
| 2014/0266263 A1* | 9/2014 | Wurzinger ............... H04R 3/00 324/686 |

FOREIGN PATENT DOCUMENTS

WO    WO-2009132437 A1 *  11/2009  ............... G01D 3/02

* cited by examiner

*Primary Examiner* — Ryan D Walsh
(74) *Attorney, Agent, or Firm* — Locke Lord LLP; Daniel J. Fiorello; Gabrielle Gelozin

(57) ABSTRACT

A method for validating a capacitance measurement device including, sending a first drive signal from a capacitance measurement device to a capacitor emulator, modifying the first drive signal by an four quadrant analog multiplier, directing the modified signal across a capacitor to produce a return signal, sending the return signal to the capacitance measurement device to validate the capacitor, and validating the return signal against an expected return signal by the capacitance measurement device.

19 Claims, 1 Drawing Sheet

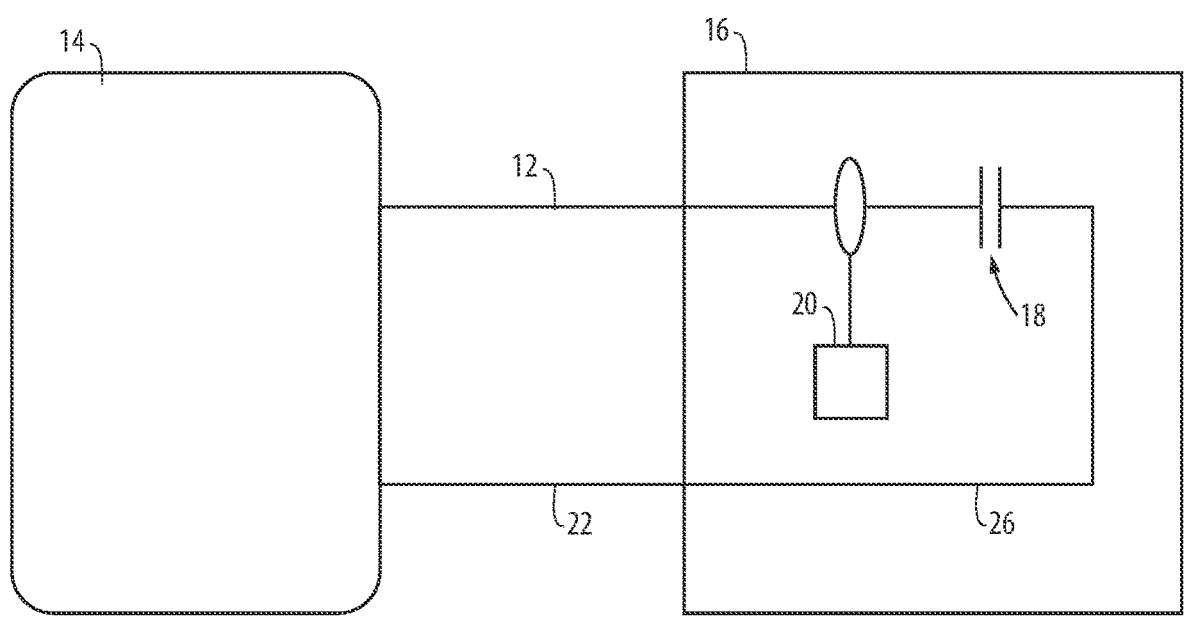

METHOD AND APPARATUS FOR VALIDATING A CAPACITIVE FUEL LEVEL SENSOR

BACKGROUND

Technological Field

The present disclosure relates generally to a validation device, specifically a device and method for validating a capacitance measurement device by emulating a variable capacitor.

Description of Related Art

Most modern aircraft use one or more capacitive fuel probes connected to a computer to produce a number that gets reported as fuel level or mass. The capacitance of the fuel probes changes as the dielectric constant of the insulating medium between the capacitor electrodes changes. The dielectric in the probes is typically either: Liquid fuel, mixture of air and fuel vapor, or combination of the two. When the fuel tanks are full, the capacitance of the probes is greater than the probe capacitance when the fuel tanks are empty. Changes in fuel level cause a change in probe capacitance.

In practice, several capacitance probes are placed throughout the tank so a better sampling can be taken. Then a computer checks these against known values to come up with a fuel quantity. As new computers and sensors are developed they have to be tested and validated. Testing of the new system requires measuring systems at various known fuel levels, and validating the right signal or response is received. Emptying and filling a gas tank over and over again can be time consuming as well as hazardous. Although conventional methods of testing measurement systems have generally been considered satisfactory for their intended purpose, there is still a need in the art for improved validation systems which can be validated faster and safer. The present disclosure provides a solution for this need.

SUMMARY OF THE INVENTION

A method for validation of a capacitance measurement device is disclosed. The method can include sending a first drive signal from a capacitance measurement device to a capacitor emulator, modifying the first drive signal by a first four quadrant analog multiplier, directing the modified signal across a capacitor to produce a return signal, sending the return signal to the capacitance measurement device to validate the capacitor, validating the return signal against an expected return signal by the capacitance measurement device. Modifying can include multiplying the signal by a negative value which may be used to negate the capacitance of connection cabling. The method can also include sending a second drive signal from a second capacitance measurement device to the capacitor emulator, wherein the second signal can include a different frequency, voltage, or shape from the first drive signal.

The method can include modifying the second drive signal by a second four quadrant analog multiplier, wherein the second multiplier is differing from the first multiplier. The second multiplier can be positive.

The return signal can be validated against the first drive signal. The method can include validating the capacitor emulator based on the return signal voltage. The method can include attaching a fuel capacitor to the capacitance measurement device.

A system for validating a capacitance measurement device is disclosed. The system includes a first signal interface for receiving a drive signal, a signal modifier operatively connected to the first signal interface for multiplying the drive signal, a capacitor operatively connected to the analog multiplier, and an operative connection from the capacitor to a second signal interface for returning a modified signal. The system can also include a controller for changing a multiplication factor of the signal modifier by either analog or digital input. The capacitance range simulated can be configured but is typically between 0 and 1000 pF.

The operative connection is meant to send a positive or negative capacitance value to the second signal interface. The first interface can couple to various capacitance measurement devices, such as a capacitance meter or a dedicated computer for sensing the signal.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic view of an embodiment of the system according to the disclosure.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of a capacitance validation system in accordance with the disclosure is shown in FIG. 1 and is designated generally by reference character 10. The system described below can be used to simulate a variable capacitance simulation using a real, fixed value capacitor so the real capacitance effects are maintained and also utilizes a known drive signal of a known source so it will function with various types of measurement devices without any adjustments or modifications.

Referring now to FIG. 1, a system 10 includes a first signal interface 12 which receives a drive signal from a signal source 14, which can be one of a variety of devices, such as a capacitance meter, or a fuel computer. A signal modifier 16 is operatively connected to the first signal interface 12 which changes the drive signal. The change in the drive signal can include any sort of multiplying modification wherein the voltage of the signal is multiplied by a factor. The factor can be negative, in order to flip the signal, useful for negating stray capacitances. The signal modifier 16 can be controlled by a controller 20.

Referring further to FIG. 1, a capacitor 18 is connected to the signal modifier 16. The capacitor 18 can be fixed value capacitor rated between 0 and 1000 pF. An operative connection 26 leads from the capacitor 18 to a second signal interface 22 which sends a modified signal back to the signal source 14. The system also includes a controller for changing a multiplication factor of the signal modifier which allows the users to toggle between different levels. For instance, a first signal (x) sent from the signal source 14 is expected to come back at 40x allows the signal source or fuel computer to detect that specific capacitance equating to a first fluid level, and a second signal (y) sent from the signal source 14 is expected to come back at 20y allowing the signal source or fuel computer to detect the second specific capacitance and equate it to a second fluid level. Toggling the incoming signal by the signal modifier 16 allows the user to quickly run a fuel computer through various "levels" of fuel without having to connect the computer to multiple capacitors and measure different levels of fuel. The return signal can then be validated against the first drive signal by the signal source.

The methods and systems of the present disclosure, as described above and shown in the drawings, provide a superior capacitance validation system. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method for validation of a capacitance measurement device comprising:
   sending a first drive signal from a capacitance measurement device to a capacitor emulator;
   modifying the first drive signal by a first four quadrant analog multiplier;
   directing the modified signal across a capacitor to produce a return signal;
   sending the return signal to the capacitance measurement device to validate the capacitor; and
   validating the return signal against an expected return signal by the capacitance measurement device.

2. The method of claim 1, wherein the modifying includes multiplying the signal by a negative value.

3. The method of claim 1, further comprising sending a second drive signal from a second capacitance measurement device to the capacitor emulator, wherein the second signal includes a different frequency, voltage, and shape from the first drive signal.

4. The method of claim 3, further comprising modifying the second drive signal by a second four quadrant analog multiplier, wherein the second multiplier is differing from the first multiplier.

5. The method of claim 3, wherein the second multiplier is positive.

6. The method of claim 1, wherein the return signal is validated against the first drive signal.

7. The method of claim 1, further comprising validating the capacitor emulator based on the return signal voltage.

8. A system for validating a capacitance measurement device comprising:
   a first signal interface for receiving a drive signal;
   a signal modifier operatively connected to the first signal interface for multiplying the drive signal;
   a capacitor operatively connected to the signal modifier; and
   an operative connection from the capacitor to a second signal interface for returning a modified signal.

9. The system of claim 8, further comprising a controller for changing a multiplication factor of the signal modifier.

10. The system of claim 8, wherein the signal modifier is an analog multiplier.

11. The system of claim 8, wherein the signal modifier is a voltage multiplier.

12. The system of claim 8, wherein the capacitor is a fixed value capacitor.

13. The system of claim 12, wherein the capacitor is rated between 0 and 1000 pF, inclusive.

14. The system of claim 8, wherein the operative connection is configured to send a positive or negative value to the second signal interface.

15. The system of claim 8, wherein the first interface is configured to couple to various sensors.

16. The system of claim 8, further comprising a capacitance meter for sending the signal.

17. The system of claim 8, further comprising a fuel computer for sensing the signal.

18. The system of claim 8, further comprising a capacitance measurement device.

19. The system of claim 18, wherein the capacitance measurement device is a fuel measurement system.

* * * * *